United States Patent
Qu

(10) Patent No.: US 12,262,381 B2
(45) Date of Patent: Mar. 25, 2025

(54) METHOD FOR SIDELINK COMMUNICATION, DEVICE AND STORAGE MEDIUM

(71) Applicant: Beijing Unisoc Communications Technology Co., Ltd., Beijing (CN)

(72) Inventor: Xin Qu, Beijing (CN)

(73) Assignee: Beijing Unisoc Communications Technology Co., Ltd., Beijing (CN)

( * ) Notice: Subject to any disclaimer, the term of this patent is extended or adjusted under 35 U.S.C. 154(b) by 348 days.

(21) Appl. No.: 17/759,189

(22) PCT Filed: Jan. 29, 2021

(86) PCT No.: PCT/CN2021/074493
§ 371 (c)(1),
(2) Date: Jul. 21, 2022

(87) PCT Pub. No.: WO2021/148042
PCT Pub. Date: Jul. 29, 2021

(65) Prior Publication Data
US 2023/0040934 A1 Feb. 9, 2023

(30) Foreign Application Priority Data
Jan. 21, 2020 (CN) .......................... 202010070301.7

(51) Int. Cl.
*H04W 72/04* (2023.01)
*H04W 72/0446* (2023.01)
(Continued)

(52) U.S. Cl.
CPC ....... *H04W 72/20* (2023.01); *H04W 72/0446* (2013.01); *H04W 72/0453* (2013.01)

(58) Field of Classification Search
CPC ... H04L 5/0055; H04L 1/1819; H04L 1/1887; H04L 5/0064; H04L 5/0032;
(Continued)

(56) References Cited

U.S. PATENT DOCUMENTS 10,470,203 B2 * 11/2019 Falahati ............ H04W 88/021
11,304,180 B2 * 4/2022 Shin ..................... H04W 24/10
(Continued)

FOREIGN PATENT DOCUMENTS

| CN | 104519577 A | 4/2015 |
|---|---|---|
| CN | 107710845 A | 2/2018 |

(Continued)

OTHER PUBLICATIONS

International Search Report and Written Opinion mailed in International Application PCT/CN2021/074493 on Apr. 20, 2021.
(Continued)

*Primary Examiner* — Jung Liu
(74) *Attorney, Agent, or Firm* — KILPATRICK TOWNSEND & STOCKTON LLP

(57) ABSTRACT

The present disclosure provides a method for sidelink communication. The method includes: a first terminal device acquires a first sidelink resource reserved for a second terminal device; and the first terminal device sends information of the first sidelink resource to the second terminal device to enable the second terminal device to acquire the first sidelink resource according to the information of the first sidelink resource. In the method of the embodiment of the present disclosure, the first terminal device can acquire the first sidelink resource reserved for the second terminal device according to resource occupation of a region where the first terminal device is located, and the second terminal device sends data according to the first sidelink resource reserved for it.

20 Claims, 5 Drawing Sheets

(51) Int. Cl.
*H04W 72/0453* (2023.01)
*H04W 72/20* (2023.01)

(58) Field of Classification Search
CPC . H04L 27/2602; H04L 5/0071; H04L 1/1893; H04L 5/0048; H04L 1/20; H04L 5/0023; H04W 24/10; H04W 28/0268; H04W 76/27; H04W 72/02; H04W 92/18; H04W 76/14; H04W 72/1263; H04W 72/0453; H04W 72/0446; H04W 28/26; H04W 72/20
See application file for complete search history.

(56) References Cited

U.S. PATENT DOCUMENTS

| | | | | |
|---|---|---|---|---|
| 11,310,776 | B2* | 4/2022 | Maaref | H04W 72/20 |
| 11,317,383 | B2* | 4/2022 | Thomas | H04W 72/02 |
| 11,601,936 | B2* | 3/2023 | Yang | H04L 5/0094 |
| 11,711,785 | B2* | 7/2023 | Rao | H04W 36/0009 370/329 |
| 11,737,055 | B2* | 8/2023 | Shin | H04W 72/535 370/330 |
| 11,849,426 | B2* | 12/2023 | Huang | H04W 72/54 |
| 11,910,242 | B2* | 2/2024 | Sarkis | H04L 5/0055 |
| 11,916,680 | B2* | 2/2024 | Ye | H04L 1/1854 |
| 11,985,666 | B2* | 5/2024 | Li | H04L 5/0078 |
| 12,010,658 | B2* | 6/2024 | Sarkis | H04W 72/02 |
| 12,058,663 | B2* | 8/2024 | Sun | H04W 72/54 |
| 12,069,617 | B2* | 8/2024 | Park | H04L 1/1812 |
| 2020/0314804 | A1* | 10/2020 | Shin | H04L 5/0055 |
| 2022/0070890 | A1* | 3/2022 | Hosseini | H04W 72/1263 |
| 2022/0070906 | A1* | 3/2022 | Wang | H04L 1/1861 |
| 2022/0078757 | A1* | 3/2022 | Wang | H04W 72/02 |
| 2022/0110104 | A1* | 4/2022 | Li | H04L 1/1812 |
| 2022/0209905 | A1* | 6/2022 | Han | H04L 1/1887 |
| 2022/0217657 | A1* | 7/2022 | Hong | H04L 1/18 |
| 2022/0330261 | A1* | 10/2022 | Yeo | H04L 5/0053 |
| 2022/0346082 | A1* | 10/2022 | Park | H04W 92/18 |
| 2023/0101824 | A1* | 3/2023 | Baek | H04W 4/40 455/522 |
| 2024/0163025 | A1* | 5/2024 | Ye | H04L 1/1825 |
| 2024/0267875 | A1* | 8/2024 | Zhou | H04L 5/0053 |

FOREIGN PATENT DOCUMENTS

| | | |
|---|---|---|
| CN | 108347772 A | 7/2018 |
| CN | 109479297 A | 3/2019 |
| CN | 110383866 A | 10/2019 |
| CN | 111277973 A | 6/2020 |
| WO | 2019233563 A1 | 12/2019 |

OTHER PUBLICATIONS

The first Office Action received in corresponding Chinese application 202010070301.7 on Jul. 5, 2022.
Intel Corporation, "Sidelink UE-to-NW Relaying for Wearable and IoT Use Cases", 3GPP TSG RAN WGJ Meeting #89 RI-1707332, May 5, 2017 (May 5, 2017).
Second Office Action received in the corresponding Chinese Application 202010070301.7, mailed Apr. 1, 2023.

* cited by examiner

METHOD FOR SIDELINK COMMUNICATION, DEVICE AND STORAGE MEDIUM

CROSS-REFERENCE TO RELATED APPLICATIONS

This application is a national stage of International Application No. PCT/CN2021/074493, filed on Jan. 29, 2021, which claims priority to Chinese Application No. 202010070301.7, filed to the China National Intellectual Property Administration on Jan. 21, 2020 and entitled "Method for Sidelink Communication, Device and Storage Medium". The disclosures of the aforementioned applications are hereby incorporated by reference in their entireties.

TECHNICAL FIELD

The present disclosure relates to the field of communication technology and, in particular to, a method for sidelink communication, a device and a storage medium.

BACKGROUND

With the development of communication technology, new radio (NR) vehicle to everything (V2X) is being studied as a key technical direction of R16 (release 16). As enhancement of long term evolution (LTE) V2X technology, NR V2X is a key technical means to enable the vehicle to everything.

SUMMARY

The present disclosure provides a method for sidelink communication, a device and a storage medium.

In a first aspect, the present disclosure provides a method for sidelink communication, including:
acquiring, by a first terminal device, a first sidelink resource reserved for a second terminal device; and
sending, by the first terminal device, information of the first sidelink resource to the second terminal device to enable the second terminal device to acquire the first sidelink resource according to the information of the first sidelink resource.

In a second aspect, the present disclosure provides a method for sidelink communication, including:
receiving, by a second terminal device, information of a first sidelink resource sent by a first terminal device, where the first sidelink resource is a sidelink resource reserved for the second terminal device; and
acquiring, by the second terminal device, the first sidelink resource according to the information of the first sidelink resource.

In a third aspect, an embodiment of the present disclosure provides a computer readable storage medium storing a computer program thereon, where the computer program, when executed by a processor, implements the method of any item of the first aspect.

In a fourth aspect, an embodiment of the present disclosure provides a first terminal device, including:
a processor; and
a memory, configured to store executable instructions of the processor;
where the processor is configured to execute the method of any item of the first aspect by executing the executable instructions.

In a fifth aspect, an embodiment of the present disclosure provides a second terminal device, including:
a processor; and
a memory, configured to store executable instructions of the processor;
where the processor is configured to execute the method of any item of the second aspect by executing the executable instructions.

DESCRIPTION OF EMBODIMENTS

Figure 1:
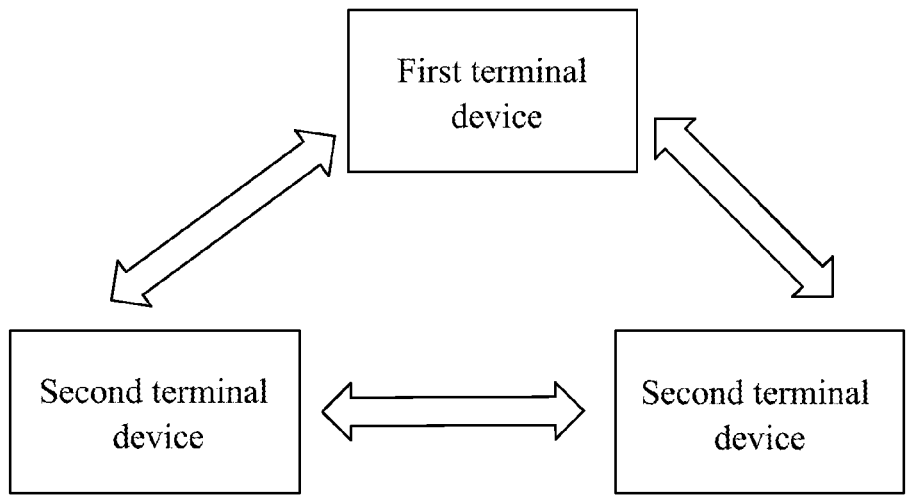
FIG. 1 is a schematic diagram of a network architecture according to an embodiment of the present disclosure.

Here, an exemplary embodiment will be described in detail, and an example thereof is shown in the drawings. When the following description relates to the drawings, unless otherwise indicated, the same number in different drawings represent same or similar elements. The implementations described in the following exemplary embodiments do not represent all implementations consistent with the present disclosure. Instead, they are merely examples of apparatuses and methods consistent with some aspects of the present disclosure as detailed in the appended claims.

The terms "include" and "have" in the description, the claims and the drawings of the present disclosure and any variation thereof are intended to cover non-exclusive inclusion. For example, processes, methods, systems, products or devices that include a series of steps or units are not limited to listed steps or units, but optionally also includes steps or units that are not listed, or optionally includes other steps or units that are inherent to these processes, methods, products or devices.

First, application scenarios involved in the present disclosure are introduced.

The method of the embodiment of the present disclosure is applicable to the V2X scenario. For example, in the vehicle to pedestrian (V2P) scenario, the vehicle to pedestrian (V2P) belongs to the V2X technology. Through information exchange between a pedestrian's terminal device and an on-board device, a collision between a vehicle and the pedestrian is prevented. V2P can detect a position, a direction and a speed of the pedestrian with the help of a smart phone, a smart wearable device or other terminal devices, and acquire a position, a direction and a speed of a surrounding vehicle through a short-wave communication technology. After calculation, if it is considered that the two or more vehicles will collide if they continue to move in their original states, warning information will be issued on the user's terminal device. At the same time, after the on-board device of the vehicle receives relevant information sent by the user's terminal device, an intelligent assistant driving system will also prompt the driver of the danger ahead through sound, an image, etc.

In a sidelink, data can be directly sent between two terminal devices without sending data to a network device first, and forwarding it through the network device, and then sending it to a terminal device at the receiving end.

FIG. 1 is a schematic diagram of a network architecture according to an embodiment of the present disclosure. The technical solution provided in the present disclosure is based on the network architecture shown in FIG. 1, which includes a first terminal device and at least one second terminal device. Exemplarily, FIG. 1 shows one first terminal device and two second terminal devices.

The first terminal device can be a road side unit (RSU for short) in the sidelink terminal, such as a road side unit arranged at an intersection, or a sidelink terminal insensitive to power consumption, and the second terminal device can be a sidelink terminal sensitive or insensitive to power consumption, such as a pedestrian's mobile phone, intelligent wearable device, etc., or an on-board device.

V2X technology includes two resource acquisition methods. One method is a resource allocation method that requires a network device (such as a base station) to perform resource scheduling, corresponding to mode 3 in LTE V2X and mode 1 in NR V2X. The other method is sensing-based resource selection, which is a resource allocation method that does not require the network device to perform resource scheduling, including mode 4 in the LTE V2X and mode 2 in the NR V2X, as well as resource selection methods through partial sensing. In the LTE V2X, in order to further reduce complexity and power consumption of a sidelink terminal, the sidelink terminal can use a method of random resource selection for vehicle to pedestrian (V2P) communication. When there is data for transmission, the sidelink terminal directly and randomly selects resources of appropriate size from a network configured or pre-configured resource pool for transmission (no resource selection through sensing). This method leads to resource collision between sidelink terminals and low reliability.

Figure 2:
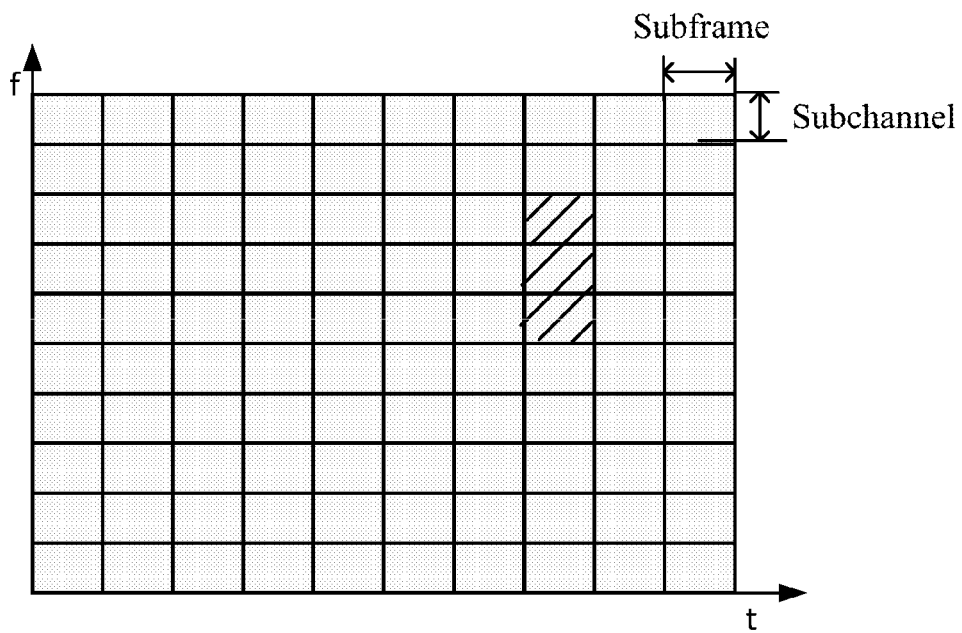
FIG. 2 is a schematic diagram of a resource pool according to an embodiment of the present disclosure.

FIG. 2 shows a group of resource pools. Granularity in the time domain is a group of slots, and granularity in the frequency domain is a group of subchannels. The group of subchannels contain M resource blocks (RB), where M is configured by a higher layer. When selecting resources, the terminal device determines that L subchannels are required for transmission according to the size of data packets. The selected transmission resource is L consecutive subchannels in a certain subframe in a resource pool. As shown in FIG. 2, the slashed part is a group of transmission resources with M=3.

In the method of the embodiment of the present disclosure, adjustment is flexibly performed according to resource occupation of a region where a second terminal device is located, a sidelink resource reserved for the second terminal device is acquired, and the sidelink resource is a resource not occupied by other terminal devices, or a resource not allocated to other terminal devices, so as to improve communication reliability and resource utilization.

The technical solution of the present disclosure is described in detail below with specific embodiments. The following specific embodiments may be combined with each other, and same or similar concepts or processes may not be repeated in some embodiments.

Figure 3:
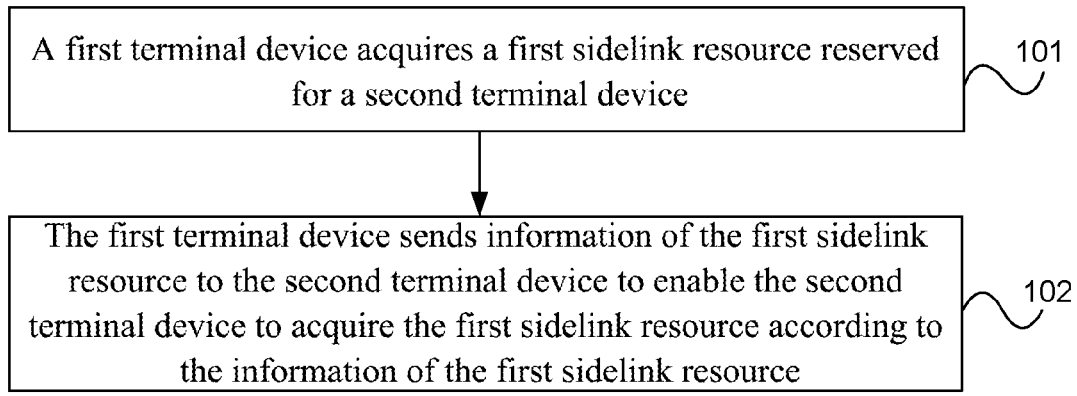
FIG. 3 is a flow diagram of an embodiment of a method for sidelink communication according to the present disclosure.

FIG. 3 is a flow diagram of an embodiment of a method for sidelink communication according to the present disclosure. As shown in FIG. 3, the method provided in this embodiment includes the following steps.

101: a first terminal device acquires a first sidelink resource reserved for a second terminal device.

Specifically, the first terminal device acquires the first sidelink resource reserved for the second terminal device, where the first sidelink resource can be acquired from a second sidelink resource scheduled and allocated by a network device, or acquired from a network configured or pre-configured resource pool through autonomous sensing.

In an embodiment, before acquiring the first sidelink resource from the second sidelink resource scheduled and allocated by the network device, the first terminal device receives information of the second sidelink resource sent by the network device.

The second sidelink resource is, for example, a resource reserved for at least one second terminal device scheduled and allocated for the first terminal device, the first terminal device selects part of the resource from the second sidelink resource for the current second terminal device, or the second sidelink resource is a resource allocated by the network device to the current second terminal device.

The resource pool can be a resource pool as shown in FIG. 2. The first terminal device acquires the resource reserved for the second terminal device from the resource pool through autonomous sensing. The resource can be a resource not used by other terminal devices and/or a resource not reserved for other terminal devices. Further, the resource may be a resource with less interference.

The first sidelink resource includes a frequency domain resource and a time domain resource; and the frequency domain resource includes at least one subchannel, and the time domain resource includes at least one time slot.

For example, at least two subchannels that are continuous or discontinuous in the frequency domain and at least two time slots that are continuous or discontinuous in the time domain are included.

The first terminal device can actively acquire the first sidelink resource reserved for the second terminal device and send the information of the first sidelink resource to the second terminal device, or acquire the first sidelink resource and send the information of the first sidelink resource to the second terminal device after a resource request sent by the second terminal device is received.

Before 101, an embodiment further includes therein the following.

The first terminal device receives a resource request from the second terminal device, where the resource request is used to request the first terminal device to send the information of the first sidelink resource reserved for the second terminal device.

102: the first terminal device sends information of the first sidelink resource to the second terminal device to enable the second terminal device to acquire the first sidelink resource according to the information of the first sidelink resource.

Specifically, after acquiring the first sidelink resource reserved for the second terminal device, the first terminal device sends the information of the first sidelink resource to the second terminal device. The second terminal device receives the information of the first sidelink resource sent by the first terminal device, acquires the first sidelink resource according to the information of the first sidelink resource, sends data according to the first sidelink resource, and communicates with other terminal devices. For example, the second terminal device selects all or part of the first sidelink resource to send data.

In an embodiment, the first terminal device sends the information of the first sidelink resource to the second terminal device through a physical sidelink control channel (PSCCH for short).

According to the method of this embodiment, the first terminal device can acquire the first sidelink resource reserved for the second terminal device according to the resource occupation of the region where the first terminal device is located, and send the information of the first sidelink resource to the second terminal device; and the second terminal device acquires the first sidelink resource according to the information of the first sidelink resource, and sends data according to the first sidelink resource reserved for it, thereby improving reliability of communication and resource utilization.

Based on the above embodiments, 102 can be implemented as follows.

One Implementation:

the first terminal device sends the information of the first sidelink resource to the second terminal device through broadcast by using a broadcast service identifier, where the broadcast service identifier is used to indicate an identifier that corresponds to the second terminal device receiving the information of the first sidelink resource broadcast by the first terminal device.

Specifically, the first terminal device sends the information of the first sidelink resource to the second terminal device through broadcast, and the second terminal device receives the information of the first sidelink resource using the corresponding broadcast service identifier, where the broadcast service identifier can be recorded as a destination ID.

In this implementation, the first terminal device can actively acquire the first sidelink resource reserved for the second terminal device and send the information of the first sidelink resource to the second terminal device.

Another Implementation:

the first terminal device sends the information of the first sidelink resource to the second terminal device through multicast by using a multicast user service identifier corresponding to the second terminal device, where the multicast user service identifier is used to indicate an identifier that corresponds to a group of second terminal devices receiving the information of the first sidelink resource multicast by the first terminal device Specifically, the first terminal device sends the information of the first sidelink resource to the second terminal device through multicast, and the second terminal device receives the information of the first sidelink resource using the corresponding multicast user service identifier, where the multicast user service identifier can be recorded as a group ID.

In this implementation, the first terminal device can actively acquire the first sidelink resource reserved for the second terminal device and send the information of the first sidelink resource to the second terminal device, or acquire the first sidelink resource and send the information of the first sidelink resource to the second terminal device after a resource request sent by the second terminal device is received.

Yet Another Implementation:

the first terminal device sends the information of the first sidelink resource to the second terminal device through unicast by using a user service identifier of the second terminal device, where the user service identifier of the second terminal device is used to indicate an identifier that corresponds to the second terminal device receiving the information of the first sidelink resource sent through unicast by the first terminal device.

Specifically, the first terminal device sends the information of the first sidelink resource to the second terminal device through unicast, the second terminal device receives the information of the first sidelink resource sent through unicast by the first terminal device by using the user service identifier of the second terminal device, and the user service identifier of the second terminal device can be recorded as a destination ID.

In this implementation, the first terminal device can actively acquire the first sidelink resource reserved for the second terminal device and send the information of the first sidelink resource to the second terminal device, or acquire the first sidelink resource and send the information of the first sidelink resource to the second terminal device after a resource request sent by the second terminal device is received.

The above service may refer to a service in which the first terminal device sends information of the sidelink resource to at least one second terminal device.

In an embodiment, the information of the first sidelink resource is carried in the sidelink control information (SCI for short). The SCI is carried by the PSCCH. The SCI can also contain any of the above service identifiers.

In an embodiment, the SCI includes a first SCI field and a second SCI field, the first SCI field carries the information of the first sidelink resource, and the second SCI field carries at least one of the following identifiers: a broadcast service identifier, a multicast user service identifier corresponding to the second terminal device, or a user service identifier of the second terminal device.

The first terminal device includes the information of the first sidelink resource in the sidelink control information (SCI). In an implementation, a format in which the SCI indicates resource information occupied by its associated data channel in NR V2X can be used. In the embodiment of the present disclosure, the first terminal device uses the SCI to indicate a group of sidelink resources to be reserved and sent to the second terminal device for use.

Since the first terminal device only conveys the information of the sidelink resource to the second terminal device, and no data is sent to the second terminal device, in an embodiment, the first terminal device uses a subchannel to transmit the SCI, that is, a subchannel in the frequency domain is used to transmit the SCI, including the first SCI field (or referred to as 1st stage SCI) and the second SCI field (or referred to as 2nd stage SCI), where the first SCI field carries the information of the first sidelink resource, and the second SCI field contains the corresponding service identifier.

Figure 4:
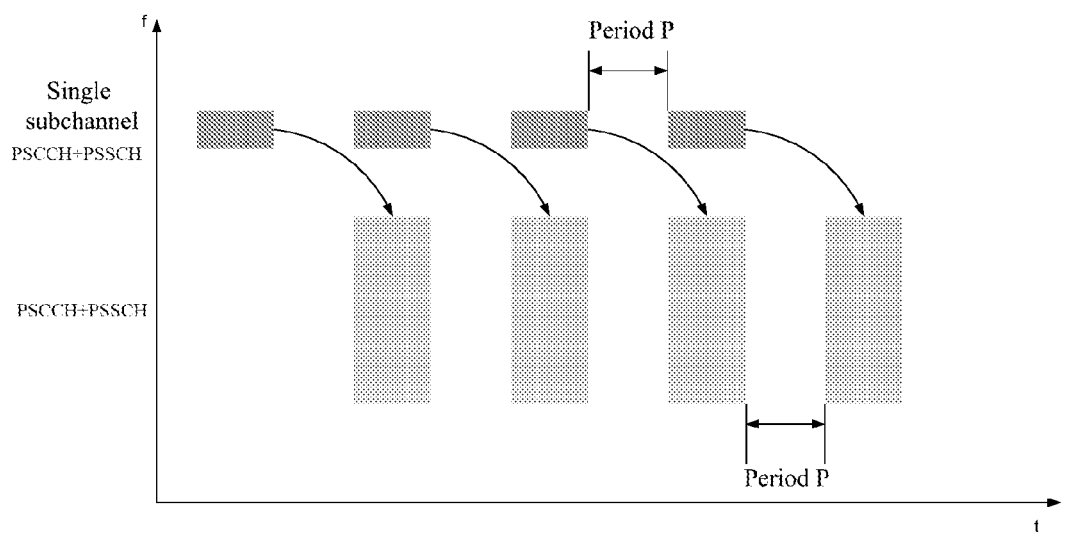
FIG. 4 is a schematic diagram of a principle of an embodiment of a method for sidelink communication according to the present disclosure.

As shown in FIG. 4, the first terminal device sends the SCI (occupying the dark gray resource block in FIG. 4) on a single subchannel with a period P. The SCI carries the information of the first sidelink resource reserved for the second terminal device, that is, the information of the first sidelink resource is indicated in the SCI. The second terminal device monitors the SCI sent by the first terminal device and obtains the information of the first sidelink resource, acquires the first sidelink resource (the light gray resource block in FIG. 4), and selects all or part of the resource from the first sidelink resource to send sidelink data. The period P can also be indicated in the SCI.

The second terminal device determines a value of the corresponding domain in the SCI to be sent according to time-frequency domain information of the selected resource, and the second terminal device sends the SCI and data on the selected resource.

In the method of this embodiment, the first terminal device can acquire the first sidelink resource reserved for the second terminal device according to resource occupation of a region where the first terminal device is located, and send the information of the first sidelink resource to the second terminal device through broadcast, multicast or unicast; and the second terminal device acquires the first sidelink resource according to the information of the first sidelink resource, and sends data according to the first sidelink resource reserved for it, thereby improving communication reliability and resource utilization.

In an embodiment, the first terminal device sends the information of the first sidelink resource, which can be implemented in the following way.

The first terminal device sends time slot offset information to the second terminal device, where the time slot offset information is used to indicate an offset between a time slot where the SCI carrying the information of the first sidelink resource is located and a first time slot in the first sidelink resource Specifically, the information of the first sidelink resource can be indicated by time slot offset information, and the time slot offset information can be used to indicate a time slot offset between a time slot where indication information carrying the information of the first sidelink resource is located and a first time slot in the first sidelink resource. For example, if the indication information is the SCI, the time slot offset can be a time slot offset between the time slot where the SCI is located and the first time slot in the first sidelink resource.

In an embodiment, for an indication method of a time domain resource of other time slot in the first sidelink resource, the solution of the R16 V2X can be used. For an indication method of a frequency domain resource included in the first sidelink resource, the solution of the R16 V2X can be used.

Figure 5:
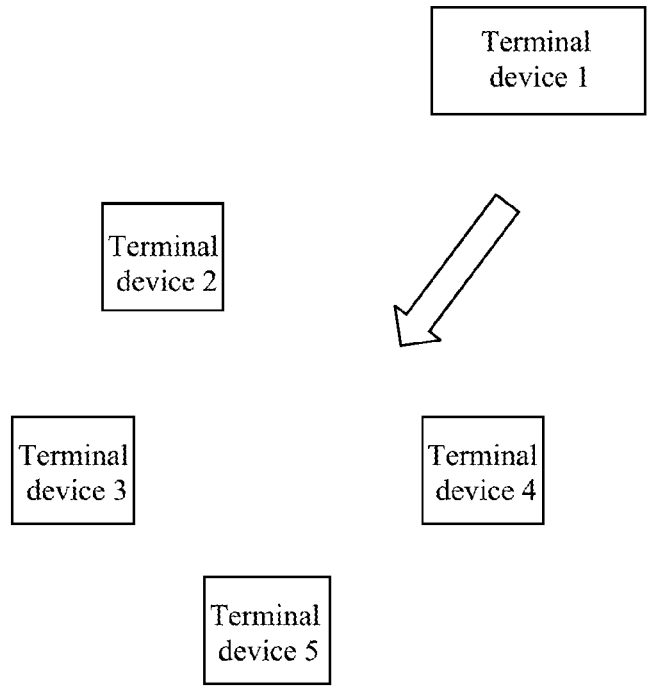
FIG. 5 is a scenario schematic diagram of an embodiment of a method for sidelink communication according to the present disclosure.

In an embodiment, as shown in FIG. 5, a terminal device 1 can be a road side unit in this embodiment, and can transmit information of a reserved first sidelink resource to a P user (the second terminal device) through a PC5 port. The first terminal device is arranged at an intersection.

Terminal devices 2-5 are P users. When having a receiving capability over the PC5 port, the terminal devices 2-5 can receive the information of the first sidelink resource sent by the terminal device 1. When driving near the intersection, in order to reduce the risk of collision with vehicles, the terminal devices 2-5 can send at least one piece of information such as their own position information, speed information or travel direction information to other vehicles, and the resources for sending the above information can be selected according to the information of the first sidelink resource sent by the road side device.

The first terminal device can send the information of the first sidelink resource to at least one of the terminal devices 2-5 through broadcast, unicast or multicast, where the first sidelink resource is reserved for the at least one of the terminal devices 2-5. The first sidelink resource can be selected from a configured resource pool by the first terminal device through sensing, or selected according to the resource allocated by the network device.

The terminal devices 2-5 may randomly select all or part of the first sidelink resource reserved for them for sending data.

Figure 6:
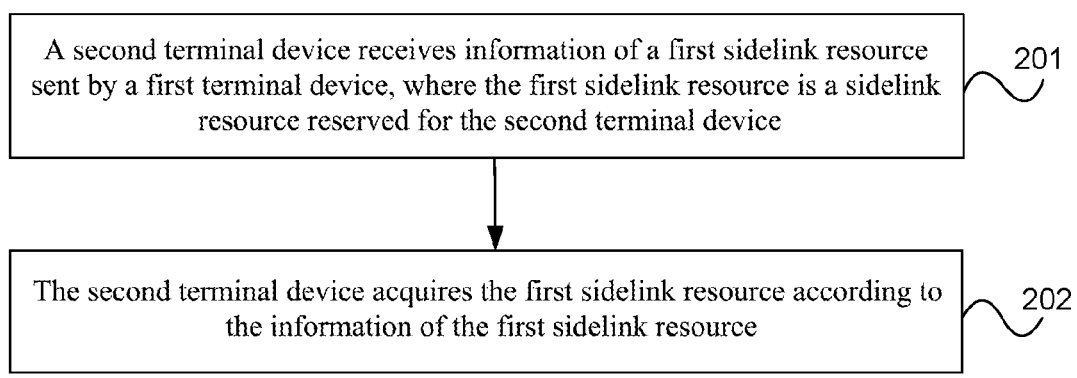
FIG. 6 is a flow diagram of another embodiment of a method for sidelink communication according to the present disclosure.
Figure 7:
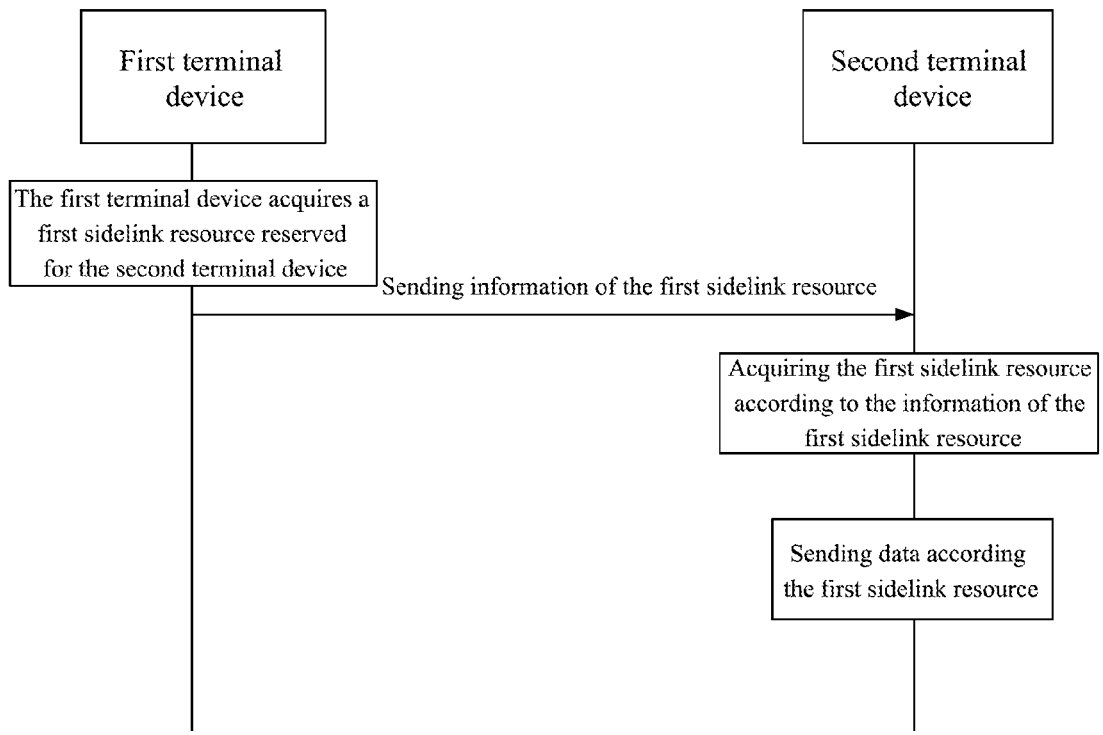
FIG. 7 is an interactive flow diagram of an embodiment of a method for sidelink communication according to the present disclosure.

FIG. 6 is a flow diagram of another embodiment of a method for sidelink communication according to the present disclosure. As shown in FIG. 6 and FIG. 7, the method provided in this embodiment includes:

201: a second terminal device receives information of a first sidelink resource sent by a first terminal device, where the first sidelink resource is a sidelink resource reserved for the second terminal device; and 202: the second terminal device acquires the first sidelink resource according to the information of the first sidelink resource.

Specifically, the first terminal device acquires the first sidelink resource reserved for the second terminal device, where the first sidelink resource can be acquired from the second sidelink resource scheduled and allocated by the network device, or acquired from a configured resource pool through autonomous sensing.

In an embodiment, before acquiring the first sidelink resource from the second sidelink resource scheduled and allocated by the network device, the first terminal device receives the information of the second sidelink resource sent by the network device.

The second sidelink resource is, for example, a resource reserved for at least one second terminal device allocated for the first terminal device, the first terminal device selects part of the resource from the second sidelink resource to be reserved for the current second terminal device, or the second sidelink resource is a resource allocated by the network device to the current second terminal device.

The resource pool can be a resource pool as shown in FIG. 2. The first terminal device acquires the resource reserved for the second terminal device from the resource pool through autonomous sensing. The resource can be a resource not used by other terminal devices and/or a resource not allocated for other terminal devices. Further, the resource may be a resource with less interference.

The first sidelink resource includes a frequency domain resource and a time domain resource; and the frequency domain resource includes at least one subchannel, and the time domain resource includes at least one time slot.

For example, at least two subchannels that are continuous or discontinuous in the frequency domain and at least two time slots that are continuous or discontinuous in the time domain are included.

The first terminal device can actively acquire the first sidelink resource reserved for the second terminal device and send the information of the first sidelink resource to the second terminal device, or acquire the first sidelink resource and send the information of the first sidelink resource to the second terminal device after a resource request sent by the second terminal device is received.

Before 201, an embodiment further includes therein the following:

the second terminal device sends a resource request to the first terminal device; where the resource request is used to request the first terminal device to send the information of the first sidelink resource reserved for the second terminal device.

After acquiring the first sidelink resource reserved for the second terminal device, the first terminal device sends the information of the first sidelink resource to the second terminal device. The second terminal device receives the information of the first sidelink resource sent by the first terminal device, acquires the first sidelink resource according to the information of the first sidelink resource, sends data according to the first sidelink resource, and communicates with other terminal devices. For example, the second terminal device selects all or part of the first sidelink resource to send data.

In an embodiment, the first terminal device sends the information of the first sidelink resource to the second terminal device through a physical sidelink control channel (PSCCH for short).

In an embodiment, the second terminal device receives the information of the first sidelink resource sent by the first terminal device includes:

the second terminal device receives the information of the first sidelink resource sent through broadcast by the first terminal device by using a broadcast service identifier; or, the second terminal device receives the information of the first sidelink resource sent through multicast by the first terminal device by using a multicast user service identifier corresponding to the second terminal device; or, the second terminal device receives the information of the first sidelink resource sent through unicast by the first terminal device by using a user service identifier of the second terminal device.

In an embodiment, after the second terminal device acquires the first sidelink resource according to the information of the first sidelink resource, the method further includes:

the second terminal device selects a second sidelink resource in the first sidelink resource randomly and uses the second sidelink resource to transmit data; where the first sidelink resource includes the second sidelink resource.

The second sidelink resource here represents a different meaning from the second sidelink resource on the first terminal device side. The second sidelink resource here refers to a sidelink resource randomly selected by the second terminal device in the first sidelink resource, that is, the second sidelink resource can be all or part of the first sidelink resource.

In one embodiment, the information of the first sidelink resource is carried in sidelink control information (SCI).

In an embodiment, the SCI includes a first SCI field and a second SCI field, the first SCI field carries the information of the first sidelink resource, and the second SCI field carries at least one of the following identifiers: a broadcast service identifier, a multicast user service identifier corresponding to the second terminal device, or a user service identifier of the second terminal device.

In an embodiment, the second terminal device receiving the information of the first sidelink resource sent by the first terminal device includes:

the second terminal device receives time slot offset information, where the time slot offset information is used to indicate an offset between a time slot where the SCI carrying the information of the first sidelink resource is located and a first time slot in the first sidelink resource.

The method of this embodiment is similar to the method of the first terminal device side embodiment in their implementation principles and technical effects, and will not be repeated here.

Figure 8:
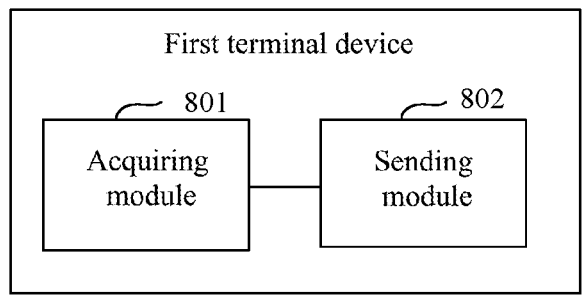
FIG. 8 is a schematic structural diagram of an embodiment of a first terminal device according to the present disclosure.

FIG. 8 is a schematic structural diagram of an embodiment of a first terminal device according to the present disclosure. As shown in FIG. 8, the first terminal device of the embodiment includes:

an acquiring module 801, configured to acquire a first sidelink resource reserved for a second terminal device; and a sending module 802, configured to send information of the first sidelink resource to the second terminal device to enable the second terminal device to acquire the first sidelink resource according to the information of the first sidelink resource.

In one possible implementation, the sending module 802 is configured to:

send the information of the first sidelink resource to the second terminal device through broadcast by using a broadcast service identifier, where the broadcast service identifier is used to indicate an identifier that corresponds to the second terminal device receiving the information of the first sidelink resource broadcast by the first terminal device; or, send the information of the first sidelink resource to the second terminal device through multicast by using a multicast user service identifier corresponding to the second terminal device, where the multicast user service identifier is used to indicate an identifier that corresponds to a group of second terminal devices receiving the information of the first sidelink resource multicast by the first terminal device; or, send the information of the first sidelink resource to the second terminal device through unicast by using a user service identifier of the second terminal device, where the user service identifier of the second terminal device is used to indicate an identifier that corresponds to the second terminal device receiving the information of the first sidelink resource sent through unicast by the first terminal device.

In one possible implementation, the information of the first sidelink resource is carried in sidelink control information (SCI).

In one possible implementation, the SCI includes a first SCI field and a second SCI field, the first SCI field carries the information of the first sidelink resource, and the second SCI field carries at least one of the following identifiers: a broadcast service identifier, a multicast user service identifier corresponding to the second terminal device, or a user service identifier of the second terminal device.

In one possible implementation, the first sidelink resource includes a frequency domain resource and a time domain resource; and the frequency domain resource includes at least one sub-channel, and the time domain resource includes at least one time slot.

In one possible implementation, the sending module 802 is configured to:

send time slot offset information to the second terminal device, where the time slot offset information is used to indicate an offset between a time slot where the SCI carrying the information of the first sidelink resource is located and a first time slot in the first sidelink resource.

In one possible implementation, the acquiring module 801 is configured to:

acquire the first sidelink resource from a second sidelink resource allocated by a network device; or, acquire the first sidelink resource from a configured resource pool through autonomous sensing.

In one possible implementation, the acquiring module 801 is further configured to:

receive a resource request from the second terminal device, where the resource request is used to request the first terminal device to send the information of the first sidelink resource reserved for the second terminal device.

The first terminal device of this embodiment can be used to execute the technical solution of the above method embodiment; implementation principles and technical effects therebetween are similar, and will not be repeated here.

Figure 9:
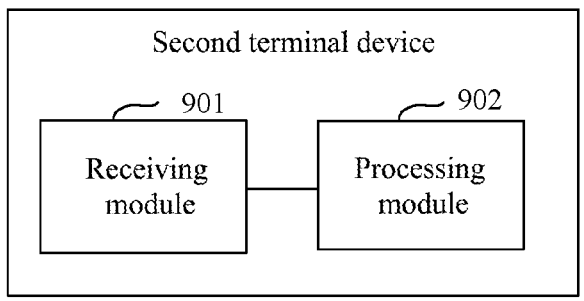
FIG. 9 is a schematic structural diagram of an embodiment of a second terminal device according to the present disclosure.

FIG. 9 is a schematic structural diagram of an embodiment of a second terminal device according to the present disclosure. As shown in FIG. 9, the second terminal device of the embodiment includes:

a receiving module 901, configured to receive information of a first sidelink resource sent by a first terminal device, where the first sidelink resource is a sidelink resource reserved for the second terminal device; and a receiving module 902, configured to acquire the first sidelink resource according to the information of the first sidelink resource.

In one possible implementation, the receiving module 901 is configured to:

receive the information of the first sidelink resource sent through broadcast by the first terminal device by using a broadcast service identifier; or, receive the information of the first sidelink resource sent through multicast by the first terminal device by using a multicast user service identifier corresponding to the second terminal device; or, receive the information of the first sidelink resource sent through unicast by the first terminal device by using a user service identifier of the second terminal device.

In one possible implementation, the processing module 902 is further configured to:

select a second sidelink resource in the first sidelink resource randomly and using the second sidelink resource to transmit data; where the first sidelink resource includes the second sidelink resource.

In one possible implementation, the information of the first sidelink resource is carried in sidelink control information (SCI).

In one possible implementation, the SCI includes a first SCI field and a second SCI field, the first SCI field carries the information of the first sidelink resource, and the second SCI field carries at least one of the following identifiers: a broadcast service identifier, a multicast user service identifier corresponding to the second terminal device, or a user service identifier of the second terminal device.

In one possible implementation, the receiving module 901 is configured to:

receive time slot offset information, where the time slot offset information is used to indicate an offset between a time slot where the SCI carrying the information of the first sidelink resource is located and a first time slot in the first sidelink resource.

The second terminal device of this embodiment can be used to execute the technical solution of the above method embodiment; implementation principles and technical effects therebetween are similar, and will not be repeated here.

Figure 10:
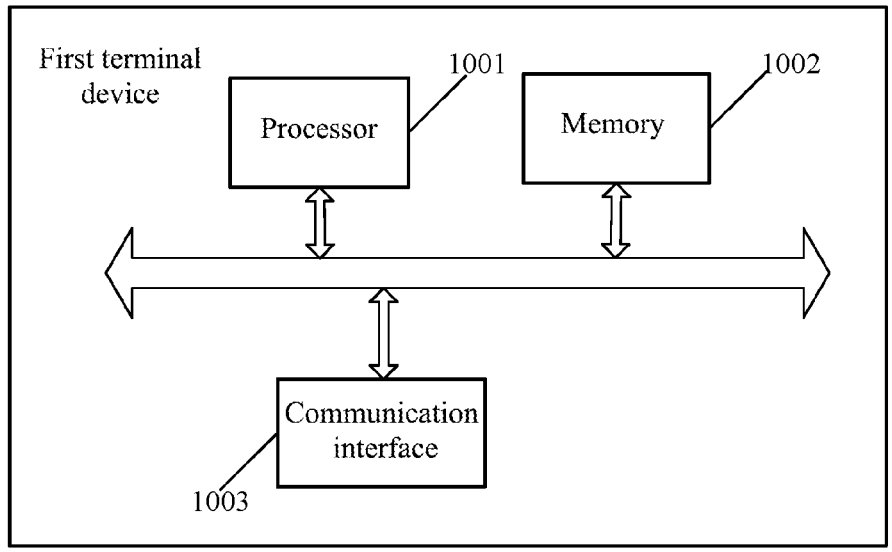
FIG. 10 is a schematic structural diagram of another embodiment of a first terminal device according to the present disclosure.

FIG. 10 is a structure diagram of another embodiment of a first terminal device according to the present disclosure. As shown in FIG. 10, the first terminal device includes:

a processor 1001, and a memory 1002 for storing executable instructions of the processor 1001.

In an implementation, the first terminal device may further include a communication interface 1003 for realizing communication with other devices.

The above components can communicate through one or more buses.

The processor 1001 is configured to execute the corresponding method in the above method embodiment by executing the executable instructions. For the specific implementation process, reference can be made to the above method embodiment, and will not be repeated here.

Figure 11:
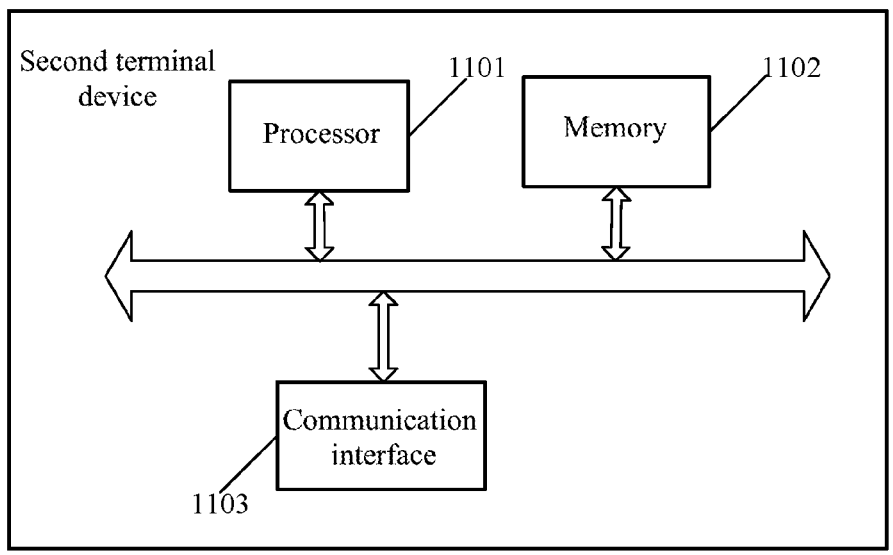
FIG. 11 is a schematic structural diagram of another embodiment of a second terminal device according to the present disclosure.

FIG. 11 is a structure diagram of another embodiment of a second terminal device according to the present disclosure. As shown in FIG. 11, the second terminal device includes:

a processor 1101, and a memory 1102 for storing executable instructions of the processor 1101.

In an implementation, the second terminal device may further include a communication interface 1103 for realizing communication with other devices.

The above components can communicate through one or more buses.

The processor 1101 is configured to execute the corresponding method in the above method embodiment by executing the executable instructions. For the specific implementation process, reference can be made to the above method embodiment, and will not be repeated here.

An embodiment of the present disclosure also provides a computer readable storage medium, on which a computer program is stored. When the computer program is executed by a processor, the corresponding method in the above method embodiments is implemented. For the specific implementation process, reference may be made to the above method embodiments; implementation principles and technical effects therebetween are similar, and will not be repeated here.

After considering the description and practicing the invention disclosed herein, those skilled in the art will easily think of other embodiments of the present disclosure. The present disclosure aims to cover any variant, use or adaptive change of the present disclosure, which follows the general principles of the present disclosure and includes knowledge or technical means in the technical field not disclosed in the disclosure. The description and the embodiments are only regarded as exemplary, and the true scope and spirit of the present disclosure are indicated by the following claims.

It should be understood that the present disclosure is not limited to the precise structure already described above and shown in the drawings, and various modifications and changes may be made without departing from the scope thereof. The scope of the present disclosure is limited only by the appended claims.

The above descriptions are merely specific embodiments of the present disclosure; however, the protection scope of the present disclosure is not limited thereto. Any modification or replacement that may be readily conceived by persons skilled in the art within the technical scope disclosed by the present disclosure should fall into the protection scope of the present disclosure. Thus, the protection scope of the present disclosure shall be subject to the claims.

The invention claimed is:

1. A method for sidelink communication, comprising:

acquiring, by a first terminal device, a first sidelink resource reserved for a second terminal device from a second sidelink resource scheduled by a network device, wherein the second sidelink resource is a resource reserved for the second terminal device, and is scheduled and allocated for the first terminal device;

selecting, by the first terminal device, part of resource from the second sidelink resource as the first sidelink resource; and sending, by the first terminal device, information of the first sidelink resource to the second terminal device to enable the second terminal device to acquire the first sidelink resource according to the information of the first sidelink resource.

2. The method according to claim 1, wherein the sending, by the first terminal device, the information of the first sidelink resource to the second terminal device comprises:

sending, by the first terminal device, the information of the first sidelink resource to the second terminal device through broadcast by using a broadcast service identifier, wherein the broadcast service identifier is used to indicate an identifier that corresponds to the second terminal device receiving the information of the first sidelink resource broadcast by the first terminal device.

3. The method according to claim 1, wherein the information of the first sidelink resource is carried in sidelink control information (SCI).

4. The method according to claim 3, wherein the SCI comprises a first SCI field and a second SCI field, the first SCI field carries the information of the first sidelink resource, and the second SCI field carries at least one of the following identifiers: a broadcast service identifier, a multicast user service identifier corresponding to the second terminal device, or a user service identifier of the second terminal device.

5. The method according to claim 1, wherein the first sidelink resource comprises a frequency domain resource and a time domain resource; and the frequency domain resource comprises at least one sub-channel, and the time domain resource comprises at least one time slot.

6. The method according to claim 3, wherein the sending, by the first terminal device, the information of the first sidelink resource to the second terminal device comprises:

sending, by the first terminal device, time slot offset information to the second terminal device, wherein the time slot offset information is used to indicate an offset between a time slot in which the SCI carrying the information of the first sidelink resource is located and a first time slot in the first sidelink resource.

7. The method according to claim 1, before sending, by the first terminal device, the information of the first sidelink resource to the second terminal device, further comprising:

receiving, by the first terminal device, a resource request from the second terminal device, wherein the resource request is used to request the first terminal device to send the information of the first sidelink resource reserved for the second terminal device.

8. A method for sidelink communication, comprising:

receiving, by a second terminal device, information of a first sidelink resource sent by a first terminal device, wherein the first sidelink resource is a sidelink resource reserved for the second terminal device, and is acquired from a second sidelink resource scheduled by a network device, and the second sidelink resource is a resource reserved for the second terminal device, and is scheduled and allocated for the first terminal device, wherein part of resource is selected by the first terminal device from the second sidelink resource as the first sidelink resource; and acquiring, by the second terminal device, the first sidelink resource according to the information of the first sidelink resource.

9. The method according to claim 8, wherein the receiving, by the second terminal device, the information of the first sidelink resource sent by the first terminal device comprises:

receiving, by the second terminal device, the information of the first sidelink resource sent through broadcast by the first terminal device by using a broadcast service identifier; or, receiving, by the second terminal device, the information of the first sidelink resource sent through multicast by the first terminal device by using a multicast user service identifier corresponding to the second terminal device; or, receiving, by the second terminal device, the information of the first sidelink resource sent through unicast by the first terminal device by using a user service identifier of the second terminal device.

10. The method according to claim 8, after acquiring, by the second terminal device, the first sidelink resource according to the information of the first sidelink resource, further comprising:

selecting, by the second terminal device, a third sidelink resource in the first sidelink resource randomly and using the third sidelink resource to transmit data; wherein the first sidelink resource comprises the third sidelink resource.

11. The method according to claim 8, wherein the information of the first sidelink resource is carried in sidelink control information (SCI).

12. The method according to claim 11, wherein the SCI comprises a first SCI field and a second SCI field, the first SCI field carries the information of the first sidelink resource, and the second SCI field carries at least one of the following identifiers: a broadcast service identifier, a multicast user service identifier corresponding to the second terminal device, or a user service identifier of the second terminal device.

13. The method according to claim 11, wherein the receiving, by the second terminal device, the information of the first sidelink resource sent by the first terminal device comprises:

receiving, by the second terminal device, time slot offset information, wherein the time slot offset information is used to indicate an offset between a time slot in which the SCI carrying the information of the first sidelink resource is located and a first time slot in the first sidelink resource.

14. A non-transitory computer readable storage medium storing a computer program thereon, wherein the computer program, when executed by a processor, implements the method according to claim 1.

15. A first terminal device, comprising:
a processor; and
a communication interface connected with the processor; and
a memory, configured to store executable instructions of the processor;
wherein the processor is configured to;
acquire a first sidelink resource reserved for a second terminal device from a second sidelink resource scheduled by a network device, wherein the second sidelink resource is a resource reserved for the second terminal device, and is scheduled and allocated for the first terminal device;
select, by the communication interface, part of resource from the second sidelink resource as the first sidelink resource; and send, by the communication interface, information of the first sidelink resource to the second terminal device to enable the second terminal device to acquire the first sidelink resource according to the information of the first sidelink resource.

16. A second terminal device, comprising:
a processor; and
a memory, configured to store executable instructions of the processor;
wherein the processor is configured to execute the method according to claim 9 by executing the executable instructions.

17. The method according to claim 1, wherein the sending, by the first terminal device, the information of the first sidelink resource to the second terminal device comprises:
sending, by the first terminal device, the information of the first sidelink resource to the second terminal device through multicast by using a multicast user service identifier corresponding to the second terminal device, wherein the multicast user service identifier is used to indicate an identifier that corresponds to a group of second terminal devices receiving the information of the first sidelink resource multicast by the first terminal device.

18. The method according to claim 1, wherein the sending, by the first terminal device, the information of the first sidelink resource to the second terminal device comprises:
sending, by the first terminal device, the information of the first sidelink resource to the second terminal device through unicast by using a user service identifier of the second terminal device, wherein the user service identifier of the second terminal device is used to indicate an identifier that corresponds to the second terminal device receiving the information of the first sidelink resource sent through unicast by the first terminal device.

19. A non-transitory computer readable storage medium storing a computer program thereon, wherein the computer program, when executed by a processor, implements the method according to claim 8.

20. The method according to claim 1, wherein the acquiring, by a first terminal device, a first sidelink resource reserved for a second terminal device from a second sidelink resource scheduled by a network device comprises:
acquiring actively, by the first terminal device, the first sidelink resource reserved for the second terminal device from the second sidelink resource scheduled by the network device.

* * * * *